US006816785B2

(12) United States Patent
Leimbach et al.

(10) Patent No.: US 6,816,785 B2
(45) Date of Patent: Nov. 9, 2004

(54) NAVIGATION DEVICE AND POSITION CORRECTION METHOD

(75) Inventors: Juergen Leimbach, Regensburg (DE); Torsten Mosis, Regensburg (DE); Markus Schupfner, Regensburg (DE); Lutz-Wolfgang Tiede, Lappersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 69 days.

(21) Appl. No.: 10/348,314

(22) Filed: Jan. 21, 2003

(65) Prior Publication Data

US 2003/0139880 A1 Jul. 24, 2003

Related U.S. Application Data

(63) Continuation of application No. PCT/DE01/02156, filed on Jul. 16, 2001.

(30) Foreign Application Priority Data

Jul. 21, 2000 (DE) .......................................... 100 35 626

(51) Int. Cl.$^7$ ............................................. G01C 21/30
(52) U.S. Cl. ..................................... 701/217; 701/208
(58) Field of Search ................................. 701/217, 220, 701/207, 209, 208, 210, 213; 340/990–995

(56) References Cited

U.S. PATENT DOCUMENTS

| 5,046,011 | A |   | 9/1991  | Kakihara et al. | ......... 364/449 |
| 5,731,978 | A | * | 3/1998  | Tamai et al.    | ......... 701/217 |
| 5,740,049 | A | * | 4/1998  | Kaise           | ......... 701/208 |
| 5,839,087 | A | * | 11/1998 | Sato            | ......... 701/207 |
| 5,862,511 | A |   | 1/1999  | Croyle et al.   | ......... 701/213 |
| 6,415,223 | B1 | * | 7/2002 | Lin et al.      | ......... 701/208 |

FOREIGN PATENT DOCUMENTS

| DE | 3434786 A1   | 4/1986  | ........... G01C/21/12 |
| DE | 42 30 299 A1 | 3/1994  | ........... G01C/21/12 |
| DE | 198 03 662 C2| 12/1999 | ........... G01C/21/12 |
| EP | 0339639      | 11/1989 | ........... G01C/21/22 |
| EP | 0349977      | 1/1990  | ........... G01C/21/14 |
| EP | 0601712      | 6/1994  | ........... G01C/21/20 |
| WO | 02/08694 A1  | 1/2002  | ........... G01C/21/30 |

OTHER PUBLICATIONS

International Preliminary Test Report PCT/DE01/02656, 4 pages, Mar. 13, 2002.
International Investigative Report PCT/DE01/02656, 7 pages, Oct. 23, 2001.

* cited by examiner

Primary Examiner—Richard M. Camby
(74) Attorney, Agent, or Firm—Baker Botts L.L.P.

(57) ABSTRACT

The described navigation system makes use of the attribute pertaining to the existence of "preferred directions," in particular, inside multi-story car parks. These preferred directions are not limited to a plane or to an orientation. Preferred directions are, in particular, longer entry and exit paths. The method detects a departure from the digitized area and then determines a preferred direction that is defined as a principle axis or a principle axis direction. When traveling within the non-digitized area, e.g. of a multi-story car park, the system monitors whether the vehicle moves within a predetermined limit of the previously defined principle axis direction. If this is the case, it is determined whether a deviation exists and this deviation is optionally corrected to conform with the principle axis direction. This enables compensation of errors that are caused, in particular, by the direction detection.

18 Claims, 3 Drawing Sheets

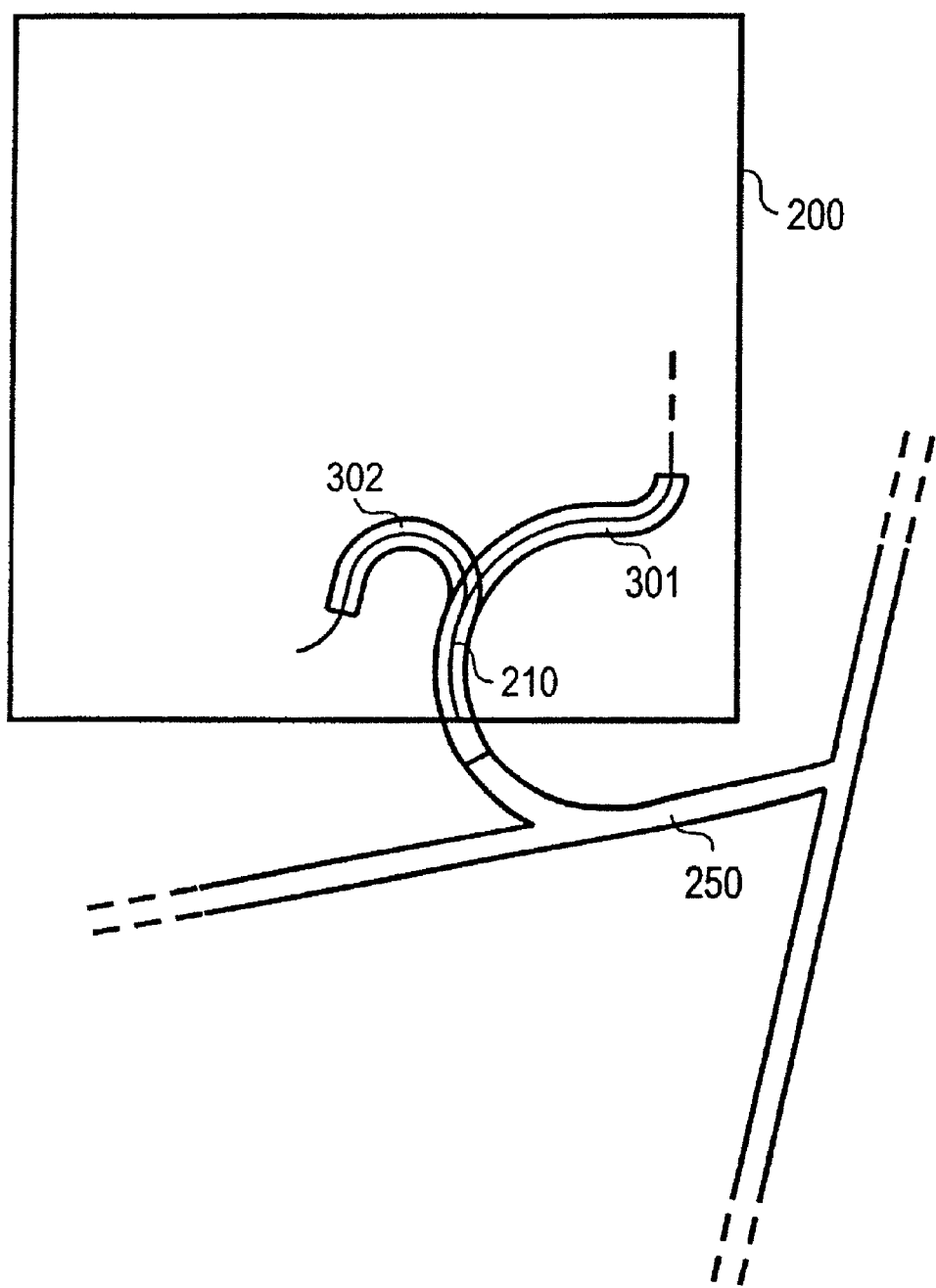

NAVIGATION DEVICE AND POSITION CORRECTION METHOD

CROSS REFERENCE TO RELATED APPLICATION

This application is a continuation of copending International Application No. PCT/DE01/02656 filed Jul. 16, 2001, which designates the United States and claims priority to German application number DE10035626.5 filed Jul. 21, 2000.

BACKGROUND OF THE INVENTION

The invention relates to a navigation device and a position correction method when traveling in non-digitized areas by means of dead-reckoning navigation.

A device of this type is used, in particular, in motor vehicles. Navigation devices have a sensor arrangement for determining a distance and a direction. A tachometer signal or an odometer signal is normally used to determine distance and a gyroscope to determine direction. In addition, GPS (Global Positioning System) location can be used. The values determined by the sensor arrangement are converted by means of a processor into a position. This position is then normally compared with a road map digitized on a storage medium. The driver of the motor vehicle is finally informed of the current position by means of a display, e.g. a color LCD display.

The digitized road map normally includes all roads which are accessible to the public. Private installations, e.g. factory sites or leisure installations, and also multi-story car parks, off-road areas with their roads and paths and the like are not normally recorded on these digitized road maps. If the motor vehicle is travelling in non-digitized areas of this type, the sensor system of a navigation system cannot be matched with the paths which are to be traveled. Sensor drift, in particular at system start-up, causes substantial deviations of the vehicle alignment and position. If a vehicle is located in an off-road area or an outdoor, unrecorded area, the current position can be determined by means of satellite location (e.g. GPS) and/or location via cellular networks (GSM, UMTS), and can be synchronized on re-entering the digitized road network. However, the sensor system often cannot be synchronized by these auxiliary means, since a function of this type is often not guaranteed, particularly in multi-story car parks.

SUMMARY OF THE INVENTION

The object of the present invention is therefore to indicate a method and a device for position correction in a navigation system for traveling in non-digitized areas by means of dead-reckoning navigation. This object can be achieved by a method for position correction in a navigation system when traveling in non-digitized areas by means of dead-reckoning navigation, comprising the following steps:
  detection of travel in a non-digitized area;
  determination of at least one principle axis direction;
  comparison of the direction of travel with the previously defined principle axis direction; and,
  in the event of matching within a predefined limit, correction of the direction of travel according to the principle axis direction.

A principle axis direction can be detected by means of a straight-line journey of predefined length. A principle axis direction can be defined by means of a journey within a predefined window area. The determined principle axis directions can be allocated to the non-digitized area and stored. At least one entry road of predefined length into the non-digitized area can be stored with reference to the non-digitized area. At least one exit road of predefined length from the non-digitized area can be stored with reference to the non-digitized area. The position detection can be de-activated until the previously stored exit road is detected after detection of a previously stored entry road. After detection of a previously stored reference point, the position detection can be de-activated until the previously stored exit road is detected.

An exemplary embodiment of a navigation device for dead-reckoning navigation according to the present invention, may comprise:
  at least one sensor arrangement for determining a distance and a direction,
  at least one processor for position calculation based on measured values of the sensor arrangement, which is connected to a memory,
  a digitized road map stored on a storage medium with digitized areas, with which a calculated position is compared, wherein
  the processor, on entry into a non-digitized area, determines at least one principle axis direction and stores it in the memory, and
  the processor compares the current direction of travel with the previously determined principle axis direction and, if necessary, corrects it according to the principle axis direction.

The processor may detect a principle axis direction by means of a straight-line journey of predefined length. The processor may define a principle axis direction by means of a journey within a predefined window area. The processor can allocate the determined principle axis directions to the non-digitized area and stores them. The processor can store at least one entry road of predefined length into the non-digitized area with reference to the non-digitized area. The processor may store at least one exit road of predefined length from the non-digitized area with reference to the non-digitized area. After detection of a previously stored entry road, the processor can deactivate the position detection until the previously stored exit road is detected. After detection of a stored reference position, the processor may de-activate the position detection until the previously stored exit road is detected.

The present invention makes use of the attribute pertaining to the existence of "preferred directions", in particular, inside multi-story car parks. These preferred directions are not limited to a plane or to an orientation. Preferred directions are, in particular, longer entry and exit paths. The inventive method detects a departure from the digitized area and then determines a preferred direction that is defined as a principle axis or a principle axis direction. When traveling within the non-digitized area, e.g. of a multi-story car park, the system monitors whether the vehicle moves within a predetermined limit of the previously defined principle axis direction. If this is the case, it is determined whether a deviation exists and this deviation is optionally corrected to conform with the principle axis direction. This enables compensation of errors that are caused, in particular, by the direction detection.

In a further development, the system can record and store entry and exit roads of a non-digitized area. On entry into a non-digitized area, a specific, definable length of an entry road can be allocated to the non-digitized area and stored in the memory. The system then operates using the method described above. As soon as the system detects that the non-digitized area has been left, a predefined length of the last-traveled road can be stored as an exit road. If the vehicle is subsequently to travel in the same non-digitized area, this can be detected through comparison with the previously stored entry road and the position determination can be deactivated. The system then waits until the previously stored exit path is detected and reactivates the position determination.

In a further development, the digitized road map can be extended to include the newly-traveled paths. These newly-recorded paths are stored in a similar manner to the road network which is already permanently stored.

BRIEF DESCRIPTION OF THE DRAWINGS

Further advantages, features and possible applications are indicated in the description of an embodiment, in conjunction with the drawings, in which:

FIG. 3 shows a representation of the entry and exit roads of a non-digitized area which are to be stored.

DETAILED DESCRIPTION OF THE PREFERRED EMBODIMENTS

Figure 1:
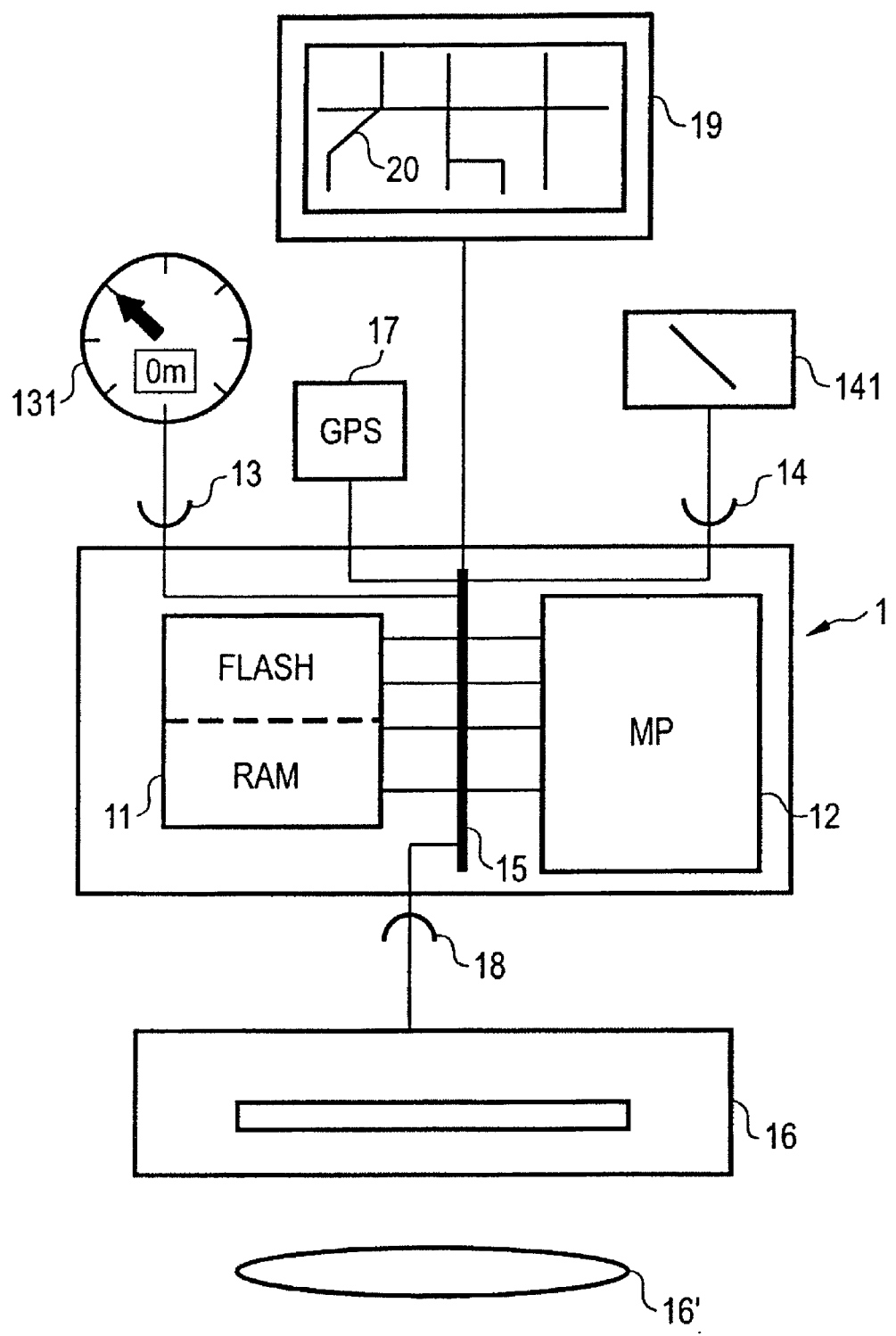
FIG. 1 shows a navigation system according to the invention.

FIG. 1 shows a navigation device 1, a memory 11, e.g. a RAM or a non-volatile memory, a microprocessor 12, an input 13 for a tachometer signal or an odometer 131, and an input 14 for a gyroscope 141 as a direction-measuring device. Furthermore, a GPS 17 can be connected to the microprocessor. The input 14 and the gyroscope 141 can also be arranged in the housing of the navigation device 1. The RAM 11, the inputs 13, 14 and a mass storage memory, which is designed as a drive 16 for a CD-ROM 16' or a DVD (Digital Versatile Disk), are connected with the microprocessor 12 via an input 18 to a system bus 15. The microprocessor 12 receives a distance signal of the odometer 131 via the input 13 and a direction signal of the gyroscope 141 via the input 14. A display 19, e.g. a color LCD screen, presents a digitized road map 20 to the driver.

The signals are measured at short intervals. The relevant measured distances and directions represent vectors which are added for position-determining purposes. Following one addition or a multiplicity of additions, the determined position is compared with a probable position on a digitized road map 20, which is stored on the disk 16'.

Figure 2:
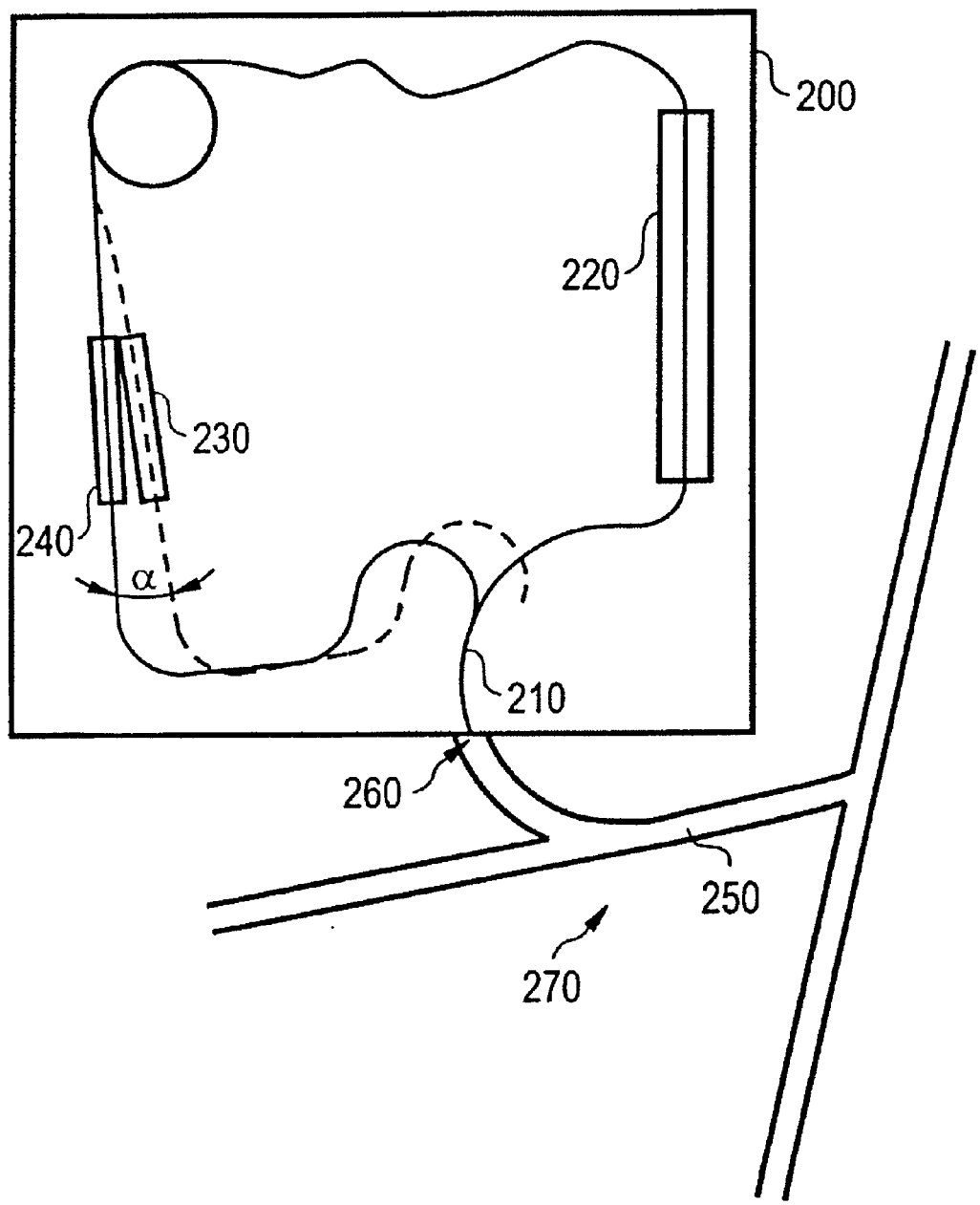
FIG. 2 shows a representation of part of a digitized road map and a non-digitized area.

FIG. 2 shows a representation of a road network with a digitized area 270 and a non-digitized area 200. The non-digitized area may, for example, be a multistory car park, which is indicated in FIG. 2 by reference number 200. The display screen 19 may of course merely display the digitized road map. To explain the present invention, FIG. 2 shows a representation of both the digitized and the non-digitized areas. The vehicle normally moves along public roads, which can be recorded by the digitized road map 270 on the CD-ROM 16'. By means of the navigation sensors 131,141, 17, the navigation device 1 calculates a position which is then allocated to a probable location on a digitized road 250 through comparison with the digitized road map 270 (map matching). The digitized map 270 may contain information indicating the start of a non-digitized area. A position 260, for example, may indicate that a non-digitized area begins.

If the vehicle moves beyond the point 260, a routine begins to record the movement within a non-digitized area 200. In the present case, the non-digitized area 200 is a multi-story car park. No GPS reception is possible inside the multi-story car park 200 due to the surrounding building. The vehicle must be positioned with the sensor data. At this time, no information whatsoever relating to the non-digitized area 200, i.e. the multi-story car park, is available. The method then uses a status device, which detects the movement status of the vehicle. The statuses straight line and bend are decisive. In the example, after the multi-story car park entrance 210, a long path is detected as a straight line. This path thereby meets the criterion for a principle axis 220 and is stored as such. A certain window area, as shown in FIG. 2, can also be used as a criterion for a principle axis, within which a vehicle must move in order to define a principle axis. A length of e.g. 30 m and a width of 1.5 to 2 vehicle widths can be selected as a practical parameter. From now on, the vehicle can move in any way through the multi-story car park. For example, it may drive to different parking levels, be parked, etc. Particularly if it is parked for a relatively lengthy period, current navigation systems have problems with positioning. The errors are largely due to drift of the gyroscope. This results mainly in vehicle alignment errors, which add up to produce position errors over the traveled path.

The method for recording the position and direction correction within a non-digitized area is described in more detail below. If the vehicle travels straight along a sufficiently long path, this path is detected and its alignment is compared with the stored principle axis 220. In the present example, a straight line 230 is detected and compared with the stored principle axis direction 220. It is established that an angle error α is present. If this angle error α lies within a limit area, e.g. 10°, the alignment of the detected straight line is matched through this angle a with the alignment of the stored principle axis 220. Due to the correction, the corrected straight line 240 is further used from now on for position determination. By means of this measure, the error, which is indicated by the broken straight line in FIG. 2, can be avoided, and correct detection of the re-entry into the digitized road network can be carried out without difficulty.

A principle axis is detected by means of the distance sensor 131 and the direction sensor 141. If the vehicle travels along a straight path of e.g. more than 30 meters with direction fluctuations which, as described above, lie within a predefined relatively narrow range, a principle axis direction is detected and stored. A plurality of these principle axis can be defined. The angle difference between the principle axis should of course be significantly greater than the limit angle within which a principle axis can be detected. The length limit for detecting a straight path, which is used for the comparison with the principle axis, may be e.g. half the length limit for detecting a principal axis. If a comparative straight line is detected, it is compared with the stored principle axis. If the alignments of the comparative straight line and a principle axis match to within a tolerance angle, the latter being effected without orientation, i.e. sign-free, the alignment of the vehicle with the appropriate principle axis is corrected. As described above, a tolerance angle of 100 can be used. If the comparative axis does not match a principle axis and if the length of the comparative straight line is greater than the limit for a principle axis, a new additional principle axis can be generated. Since the alignment of the vehicle is corrected according to the principle axis of the multi-story car park more often, the dead-reckoning location errors are minimized. Due to the smaller direction errors, the position errors also remain small, since they result from the direction error and the road travelled.

Distance errors play more of a subordinate role here, since they are normally continuously corrected and the time spent in a non-digitized area is relatively short compared with the time spent in the digitized area. Even if distance errors within the non-digitized area cannot be corrected, the precision of the distance determination is sufficiently high.

The information gathered during a journey in a non-digitized area can be allocated to this non-digitized area and can be used for future journeys in the non-digitized area. For example, all information relating to all recorded principle axis can be permanently allocated to this area and stored in the non-volatile part of the memory 11. The non-digitized area can be stored via Cartesian coordinates which are estimated on the basis of the first journey within the non-digitized area. On re-entry into the non-digitized area, the previously stored principle axis can then be used for position correction.

In a further development of the present invention, since position detection is not necessary within the non-digitized area, both an entry path into and an exit path from the non-digitized area can be defined with a respective pre-defined length and stored. As shown in FIG. 3, e.g. on entering the non-digitized area, the characteristic of the entry path into the multi-story car park 200 is recorded and stored for this purpose. The coordinates of several points, for example, are sampled and stored for digital recording. The length of this path may be limited to e.g. 30 meters.

With the area 301, FIG. 3 shows the digitally recorded entry path into the multi-story car park 200. The position correction method described above is used while the vehicle remains in the multi-story car park. The characteristic of the last 30 meters of the path travelled by the vehicle, for example, can be continuously stored temporarily in the memory. If it is detected that the vehicle has left the non-digitized area and is again located on a digitized road, the last-stored characteristic of the last 30 meters of the path traveled can be stored as the exit road of the non-digitized area. Characteristic data of a non-digitized area are recorded in this way.

If this previously recorded non-digitized area is again entered on future journeys, the navigation device detects entry into the non-digitized area using the previously stored characteristic of the entry path 301. Precise position detection and error correction can now be de-activated. The system then merely monitors the characteristic of the traveled path and compares it with the previously stored exit path 302. If travel along the exit road 302 is detected, the system switches over to normal navigation operation. The limit area of the non-digitized area, for example, can be monitored as an additional security measure in order to instigate resynchronization with the digitized map in the event of departure from this area.

In a simpler design, the recording of characteristic features of the entry path can be entirely omitted. If a digitized road map, as shown, for example, in FIG. 2, should have stored a recording point 260, the system detects entry into a non-digitized area when this point is traveled over. From then on, merely the travel along the exit road 302 has to be waited for in order to re-synchronize the system with the digitized road map. The exit road is recorded as described above.

In a further development, a digitized road map can be extended by the above method in such a way that additional digital extension maps are formed by traveling in the non-digitized area. Instead of the entry and exit roads, all roads/paths traveled are digitally recorded. These can then be stored in a non-volatile memory of the memory area 11. Using this method, often-traveled, non-digitized roads and paths can be stored and the permanently predefined, digitized road map which is used can be continuously extended. Thus, for example, areas such as factory sites or leisure installations, in which the user regularly travels, can be detected and permanently stored. The errors made in the case of journeys in these non-digitized areas are thereby minimized by the self-learning method. If these newly recorded segments are linked to the existing digitized map, the digitized map can be dynamically extended and the information thus obtained can also be used for navigation within previously non-digitized areas. Since this function requires substantial memory space, it can only be activated for areas specifically required by the driver by means of operating components on the navigation device.

What is claimed is:

1. A method for position correction in a navigation system when traveling in non-digitized areas using dead-reckoning navigation, comprising:
   detecting travel in a non-digitized area;
   determining at least one principle axis direction;
   comparing the direction of travel with the previously defined principle axis direction; and,
   in the event of matching within a predefined limit, correcting the direction of travel according to the principle axis direction.

2. The method as claimed in claim 1, further comprising detecting a principle axis using a straight-line journey of predefined length.

3. The method as claimed in claim 2, further comprising defining the principle axis direction using a journey within a predefined window area.

4. The method as claimed in claim 1, wherein the determined principle axis directions are allocated to the non-digitized area and stored.

5. The method as claimed in claim 1, wherein at least one entry road of predefined length into the non-digitized area is stored with reference to the non-digitized area.

6. The method as claimed in claim 1, wherein at least one exit road of predefined length from the non-digitized area is stored with reference to the non-digitized area.

7. The method in claim 5, wherein, following detection of a previously stored entry road, the position detection is de-activated until the previously stored exit road is detected.

8. The method in claim 6, wherein, following detection of a previously stored entry road, the position detection is de-activated until the previously stored exit road is detected.

9. The method as claimed in claim 6, wherein, following detection of a previously stored reference point, the position detection is de-activated until the previously stored exit road is detected.

10. A navigation device for dead-reckoning navigation, comprising:
    at least one sensor arrangement for determining a distance and a direction,
    at least one processor for position calculation based on measured values of the sensor arrangement, which is connected to a memory,
    a digitized road map stored on a storage medium with digitized areas, with which a calculated position is compared, wherein
    the processor, on entry into a non-digitized area, determines at least one principle axis direction and stores it in the memory, and
    the processor compares the current direction of travel with the previously determined principle axis direction and, if necessary, corrects it according to the principle axis direction.

11. The navigation device as claimed in claim 10, wherein the processor detects a principle axis direction by means of a straight-line journey of predefined length.

12. The navigation device as claimed in claim 10, wherein the processor defines a principle axis direction by means of a journey within a predefined window area.

13. The navigation device as claimed in claim 10, wherein the processor allocates the determined principle axis directions to the non-digitized area and stores them.

14. The navigation device as claimed in claim 10, wherein the processor stores at least one entry road of predefined length into the non-digitized area with reference to the non-digitized area.

15. The navigation device as claimed in claim 10, wherein the processor stores at least one exit road of predefined length from the non-digitized area with reference to the non-digitized area.

16. The navigation device as claimed in claim 14 wherein, following detection of a previously stored entry road, the processor deactivates the position detection until the previously stored exit road is detected.

17. The navigation device as claimed in claim 15 wherein, following detection of a previously stored entry road, the processor deactivates the position detection until the previously stored exit road is detected.

18. The navigation device as claimed in claim 15, wherein, following detection of a stored reference position, the processor de-activates the position detection until the previously stored exit road is detected.

* * * * *